United States Patent [19]

Mishima et al.

[11] Patent Number: 4,823,194

[45] Date of Patent: Apr. 18, 1989

[54] METHOD FOR PROCESSING GRAY SCALE IMAGES AND AN APPARATUS THEREOF

[75] Inventors: Tadaaki Mishima, Hitachi; Morio Kanasaki; Masao Takatoo, both of Katsuta; Kazunori Fujiwara; Yoshiki Kobayashi, both of Hitachi, all of

[73] Assignee: Hitachi, Ltd., Tokyo, Japan

[21] Appl. No.: 79,874

[22] Filed: Jul. 30, 1987

[30] Foreign Application Priority Data

Aug. 1, 1986 [JP] Japan .................................. 61-179985
Jan. 16, 1987 [JP] Japan .................................... 62-8593

[51] Int. Cl.$^4$ ............................................... H04N 1/40
[52] U.S. Cl. ...................................... 358/282; 358/93; 358/101; 358/125; 358/166
[58] Field of Search .................... 358/93, 96, 101, 125, 358/160, 166, 167, 282

[56] References Cited

U.S. PATENT DOCUMENTS

| | | | |
|---|---|---|---|
| 4,065,788 | 12/1977 | Meier | 358/166 |
| 4,258,394 | 3/1981 | Kennedy | 358/166 |
| 4,546,383 | 10/1985 | Abramatic | 358/96 |
| 4,670,788 | 6/1987 | Ozaki | 358/101 |
| 4,706,120 | 11/1987 | Slaughter | 358/125 |
| 4,729,019 | 1/1988 | Roovrais | 358/166 |

OTHER PUBLICATIONS

Institute of Electrical Communication Engineers (Japan) Technical Study Group on Pattern Recognition and Learning, Report PRL 85-73, pp. 35-46.

Primary Examiner—Howard W. Britton
Attorney, Agent, or Firm—Antonelli, Terry & Wands

[57] ABSTRACT

An original picture taken by an ITV camera is subject to a local maximum filter processing and, if necessary, further to a local minimum filter processing, so that a background image is formed from the original picture itself. A target image included in the original picture is extracted separated from the background image by the subtraction between the thus obtained background image and the original picture. According to the present invention, since the background image is formed on the basis of the original picture, the unevenness or change of brightness, which equally influences on both of the target image and the background image, has no influence on the accurate extraction of the target image.

20 Claims, 17 Drawing Sheets

FIG. 1a
PRIOR ART
FIG. 1b
PRIOR ART
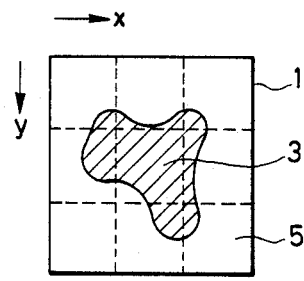
FIG. 1c
PRIOR ART
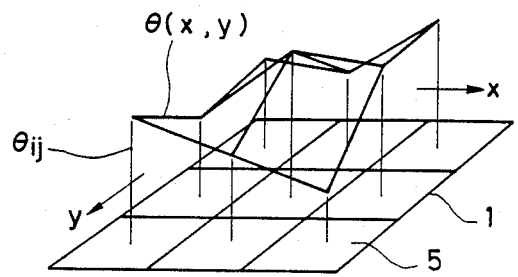

(MAX. FILTERING)

(MIN. FILTERING)

$F = \max(f_i) \, (i = 1 \sim 9)$

FIG. 14
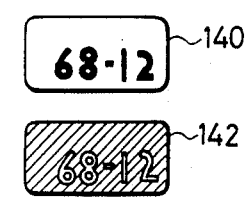
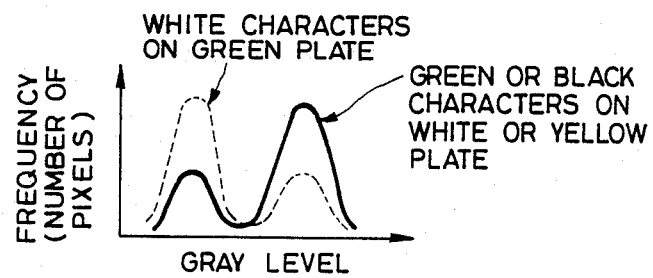
FIG. 15
FIG. 16
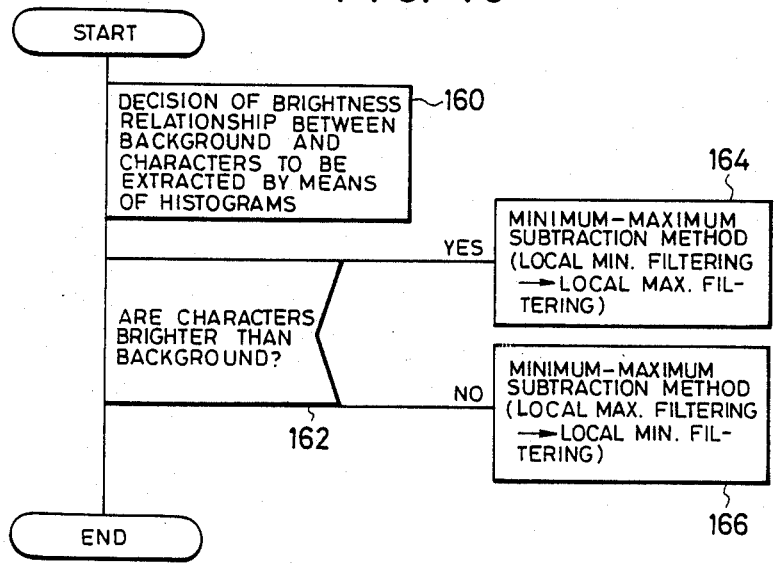

| x f5 | f4 | x f3 |
|---|---|---|
| f6 | f1 | f2 |
| x f7 | f8 | x f9 |

PIXELS WITH X ARE NOT CARED ABOUT

| f5 | f4 | f3 |
|---|---|---|
| f6 | f1 | f2 |
| f7 | f8 | f9 |

X : DON'T CARE

| X | X | O | X | X |
|---|---|---|---|---|
| X | O | O | O | X |
| O | O | O | O | O |
| X | O | O | O | X |
| X | X | O | X | X |

METHOD FOR PROCESSING GRAY SCALE IMAGES AND AN APPARATUS THEREOF

BACKGROUND OF THE INVENTION

1. Field of The Invention

The present invention relates to a method and apparatus for processing a gray scale image, and especially to a method and apparatus capable of adequately processing such an image that has a cluttered background and/or the unevenness in its brightness.

2. Description of The Related Art

Generally, in the case where characters or a figure are to be recognized by an image processing system, there is often used the technique, in which image data of a gray scale picture taken by, for example, an industrial television (ITV) camera is binarized with a certain threshold of a gray level (i.e., brightness) and the thus binarized image data is processed for recognition. Such a threshold can be easily determined in advance, when high contrast images, such as black characters on a white background, are subjected to processing for the recognition of characters or a figure. Also, it is not so difficult, if there is no unevenness or fluctuation in the illumination on a subject which has characters or a figure to be recognized thereon.

However, the aforesaid threshold can not be easily determined in more general applications as follows; the recognition of characters or figure on patterned packing boxes or outdoor billboards, the extraction of specific characters or a pattern from complicated patterns of printed circuit boards, and the recognition of the vehicle license numbers of running vehicles. In these applications, characters or figure to be recognized or extracted lie in complicated backgrounds, and the brightness of the illumination can changed very greatly. Therefore, it is very difficult to deteriminate a single appropriate threshold for extracting a subject to be recognized, while distinguishing it from a complicated background or eliminating the influence of the unevenness or fluctuation of illumination.

To overcome the above mentioned problems, for example, a method as disclosed in pp. 35 to 46 of a report PRL85-73 of Technical Study Group on Pattern Recognition and Learning, Institute of Electrical Communication Engineers of Japan (February, 1986) has been proposed. According to this, as shown in FIG. 1a, one frame of a gray scale picture 1, which is taken by an ITV camera, for example, and includes a FIG. 3 to be recognized, is divided into plural subblocks 5. As shown in FIG. 1b, appropriate thresholds $\theta_{ij}$ are determined for the respective subblocks 5. The determination of the thresholds in this case is grasped as a two-class problem, according to which image data within the subblock 5 classified into black and white classes, and the threshold $\theta_{ij}$ in each subblock 5 is selected to be a value which makes the dispersion between the classes maximal.

Further, in order to maintain the continuity between the subblocks 5, as shown in FIG. 1c, an interpolation is conducted between the thresholds $\theta_{ij}$ of the adjacent subblocks 5 pixel by pixel and, as a result, a threshold $\theta(x, y)$ for every pixel can be obtained. The input image data of the gray scale picture are binarized on the basis of the corresponding threshold $\theta(x, y)$ thus obtained pixel by pixel.

In the prior art mentioned above, in order to determine the threshold $\theta_{ij}$ within a certain subblock 5, two-dimensional image data is converted into one-dimensional data on the basis of the histogram of the gray level distribution of a gray scale picture, which is obtained with respect to a certain subblock 5. Since, therefore, the positional information of the gray level can not be taken into consideration for the determination of a threshold, it is impossible to determine the threshold accurately. Further, the threshold $\theta(x, y)$ for each pixel is obtained by the interpolation on the basis of $\theta_{ij}$ determined as above, and therefore the threshold $\theta(x, y)$ for a certain pixel can become different from a true value for the certain pixel. Moreover, the data processing as described above necessitates a considerably long processing time. As a result, it becomes impossible to recognize the subject to be extracted on a real time basis.

SUMMARY OF THE INVENTION

The present invention has been made, taking account of the problem or defect of the prior art as mentioned above, and the object thereof is to provide a method and apparatus for extracting a target image such as characters or a figure from an original gray scale picture to be processed clearly at a high speed, even if the original picture has a complicated background and/or even under the condition that the illumination in the original picture is uneven or changed.

The feature of the present invention is in that, in a method and apparatus for processing a gray image which processes an original gray picture composed of a target image and a background image and extracts the target image separated from the background image, the background image is obtained on the basis of the original picture and the target image is extracted by a calculation between the thus obtained background image and the image data of the original picture.

According to the present invention, the background image is obtained from the image data of the original picture to be processed, which includes the target image to be extracted. Accordingly, the thus obtained background image is influenced by the same condition as the target image to be extracted, so that a contrast image of the target image is obtained by the calculation between the thus obtained background image and the image data of the original picture without any influence of the unevenness or change of the brightness of the original picture. As a result, when the contrast image of the target image is binarized, it is very easy to determine a threshold for the binarization.

BRIEF DESCRIPTION OF THE DRAWINGS

FIGS. 1a to 1c are drawings for explaining the determination of the thresholds in the prior art;

FIG. 14 shows examples of a vehicle license number plate for explaining another application of the present invention;

FIG. 15 is a diagram showing the difference in the histogram between the two examples shown in FIG. 14;

FIG. 16 is a flow chart showing the operation of the another application, in which the numbers on the vehicle license number plates as shown in FIG. 14 are extracted;

DESCRIPTION OF THE PREFERRED EMBODIMENTS

Before entering the description of an embodiment of the present invention, the explanation will be made of the operational principle of a local maximum filter and a local minimum filter, which are employed in the present invention, referring to FIGS. 2a to 2d.

For simplification, let us consider the case where a black character or numeral, which is to be extracted or recognized, is printed on a white board. Therefore, the brightness is higher in a background portion than in the character portion.

At first, a gray scale picture including such character is taken by an ITV camera, for example. Image data for every pixel is first stored in an appropriate storage for successive image processing. The image data includes information of the gray level (brightness) and the position of each pixel. If data of the gray level of all pixels on a certain scanning line is plotted with respect to the positions of the pixels, a gray level distribution profile as shown by a solid line in FIG. 2b, for example, is obtained. In the profile, a recessed portion corresponds to a part of the character to be recognized, and a portion of the high gray level corresponds to the background.

Figure 2A:
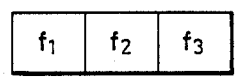
FIGS. 2a to 2d are explanatory drawings showing the operational principle of a local maximum filter and a local minimum filter, which are utilized in the present invention.

Also for simplification, an one-dimensional filter, as shown in FIG. 2a, is taken here as an example. The filter shown covers three consecutive pixels $f_1$, $f_2$ and $f_3$. The number of pixels covered by a filter is called the size of the filter, hereinafter.

As already described, two kinds of filters are utilized in the present invention, one of which is a local maximum filter, in which a value of a center one of the three pixels $f_1$, $f_2$ and $f_3$ is replaced by the maximal one among the values of the three pixels. The other filter is a local minimum filter, in which, contrary to the above, a value of a center one of the three pixels $f_1$, $f_2$ and $f_3$ is replaced by the minimal one of the values of the three pixels.

Figure 2B:
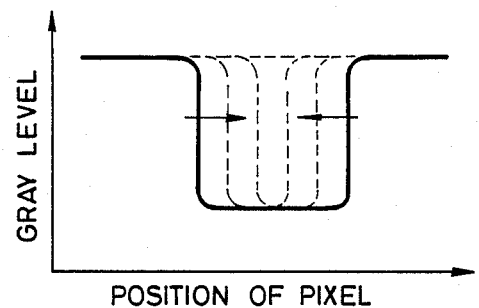

If the local maximum filter is applied to a series of pixels of the gray level distribution profile as shown in FIG. 2b, the recessed portion of the profile is narrowed pixel by pixel from both sides of the recess, every time the filtering operation is carried out, and after several times of filtering operation, the gray level of the recessed portion at last becomes equal to that of the neighboring portion. This fact means that the gray levels of all the pixels on a certain scanning line are made equal to the gray level of the background. In FIG. 2b, the recessed portion of the gray level distribution profile is extinguished after three times of the operation of the local maximum filter. This is because the recessed portion corresponds to five in terms of the number of pixels.

Generally, the recessed portion disappears, when the filtering operation is carried out u times, if the recessed portion has the width corresponding to 2u pixels, or when the filtering operation is carried out (u+1) times, if the recessed portion has the width corresponding to (2u+1) pixels, wherein u is integer. Further, in the following description, when u repetitions of the local maximum filtering operation are carried out with respect to a gray level distribution g, a result thereof is expressed as F{g}max(u).

Figure 2C:
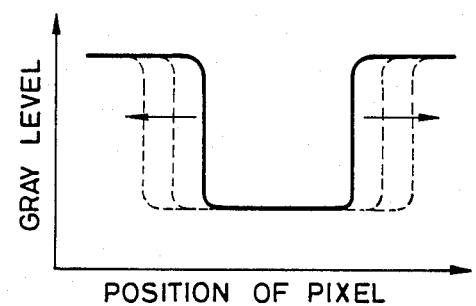

In the local minimum filter, as shown in FIG. 2c, the recessed portion of the gray level distribution profile is widened pixel by pixel every time the filtering operation is performed. In this case, the gray levels of all the pixels on a certain scanning line are made equal to the gray level of the character to be extracted or recognized. If u times of the local minimum filtering operation are carried out with respect to a gray level distribution g, a result thereof is expressed as F{g}min(u), hereinafter.

Figure 2D:
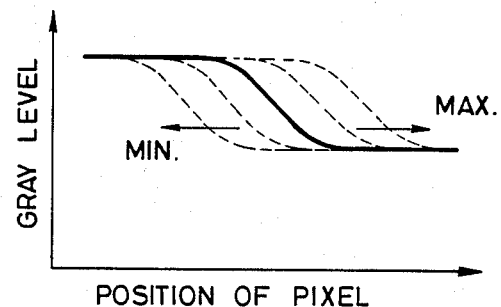

The following will be understood from the function of the two filters described above. Namely, if there is a sloped portion in the gray level distribution profile, the sloped portion is shifted rightward or leftward by carrying out the local maximum or minimum filtering, as shown in FIG. 2d. Further, if u times of the local maximum filtering operation are carried out with respect to a gray level distribution g and thereafter v times of the local minimum filtering operation are carried out with respect to the result of the local maximum filtering operation, a result thereof is expressed as F{g}max(u)·min(v), hereinafter.

Referring next to FIGS. 3a to 3e, the explanation will be made of a method of extracting a background image and forming a contrast image in accordance with an embodiment of the present invention, taking a case of a one-dimensional image as an example.

Figure 3A:
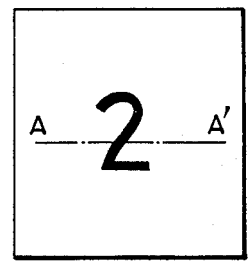
FIG. 3a shows an example of an original picture to be processed, which includes a target image (a numeral "2" in this case)
Figure 3B:
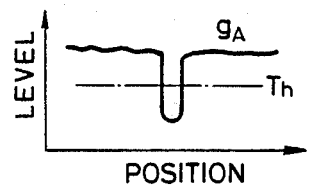
FIGS. 3b to 3e are diagrams showing the gray level distributions of various images, when the target image is extracted in accordance with an embodiment of the present invention.

FIG. 3a shows an original picture to be processed, which is taken by an ITV camera and includes a character (a target image) to be extracted or recognized. Assuming that the original picture to be processed has a black-painted numeral "2" to be extracted or recognized on a white background. In such a case, a gray level distribution profile along a certain scanning line A—A' of the original picture becomes a profile $g_A$ shown in FIG. 3b, in which gray levels are plotted with respect to positions of pixels lying on the scanning line A—A'. As shown in FIG. 3b, gray levels in a portion (pixels) corresponding to the background are high (i.e., bright), and those in a portion corresponding to a part of the numeral to be extracted are low (i.e., dark).

In this example, a threshold $T_h$ is set in advance and gray levels are binarized pixel by pixel on the basis of the threshold $T_h$, i.e., a logical "0" is assigned to a pixel which has a gray level lower than the threshold $T_h$ and a logical "1" is assigned to a pixel which has a gray level higher than the threshold $T_h$. If such binarization is conducted with respect to all of the scanning lines of the original picture, the numeral "2", i.e., the target image, can be extracted by tracing either the logical "0" or "1" signal.

As already described, however, the brightness of the background is not always even over the whole surface of the original picture, so that the determination of the threshold $T_h$ becomes difficult. In this respect, the further description will be made in detail later.

Next, the explanation will be done of forming a gray level distribution profile of the background on the basis of the original picture.

Figure 3C:
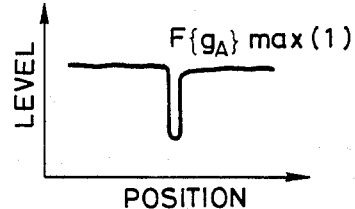

If the aforesaid local maximum filtering operation is carried out once with respect to the gray level distribution profile $g_A$ as shown in FIG. 3b, the profile as shown in FIG. 3c is obtained, which is represented as F{$g_A$}max(1) in accordance with the definition as already described. Compared with the profile of FIG. 3b, that of FIG. 3c has a narrower recessed portion.

Figure 3D:
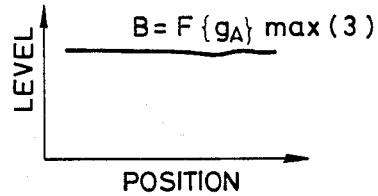

If the local maximum filtering operation is repeated three times, for example, the gray level distribution profile becomes flat as shown by B (=F{$g_A$}max(3)) in FIG. 3d. Data of the character (the dark portion) has been replaced by data of the background (the bright portion) by this filtering operation. Namely, data of the background can be easily obtained from the image data of the original picture by the local maximum filtering operation, the repetition times of which depend on the thickness of the character to be recognized.

Figure 3E:
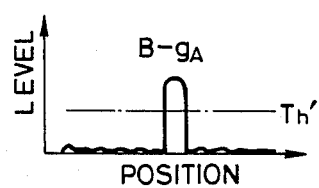

Further, if the original profile $g_A$ is subtracted from the background B, image data of the profile as shown in FIG. 3e is obtained, in which the portion of the character is contrasted. Such a difference image is obtained on the basis of the contrast of a target image to be extracted to the background and is almost constant irrespective of any change of the brightness of the original picture. Therefore, a threshold for the binarization of such a contrast image can be easily determined.

In the foregoing, the description has been made of the case where the deep color character is extracted from the light color background. In the case where the bright character is extracted from the dark background, however, the local minimum filtering operation is carried out in place of the local maximum filtering operation and the background image is subtracted from the original image.

By the way, in an actual original picture, there are often not only images having and even brightness, but also images having and inclined brightness (uneven brightness). In the following, an explanation will be presented for the case where the image having and uneven brightness is subject to the processing as mentioned above, referring to FIGS. 4a to 4f. The gray level distribution profile of an image having an uneven brightness becomes as shown by g in FIG. 4a. If the profile g is subject to a local maximum filtering operation once, the profile changes to F{g}max(1) as shown by a solid line in FIG. 4b. A broken line in FIG. 4b shows the original profile g.

Figure 4A:
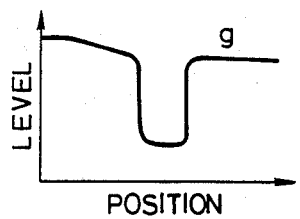
FIGS. 4a to 4f are diagrams showing the gray level distributions of various images, when the target image is extracted in accordance with another embodiment of the present invention, however in this case an original picture to be processed (not shown) includes a partially bright portion.
Figure 4B:
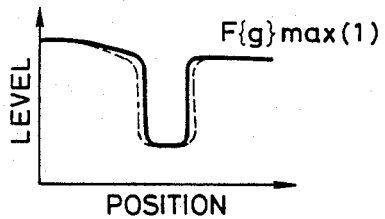
Figure 4C:
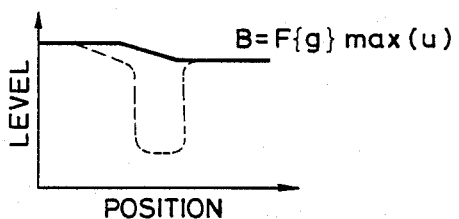
Figure 4D:
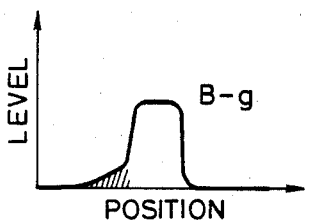
Figure 4E:
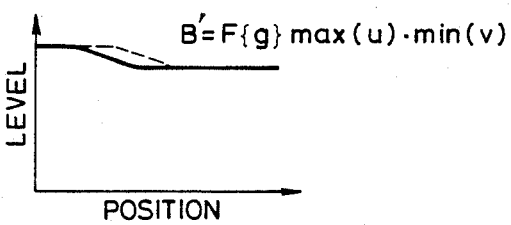

If the local maximum filtering operation is repeated a plurality of times which depend on the thickness of the target image to be extracted, u times in this case, the profile as shown by a solid line in FIG. 4c is obtained finally, which is the gray level distribution profile B (=F{g}max(u)) of the background. A broken line in FIG. 4c shows the original profile g. As apparent from the comparison between the profiles B and g, there is a difference in the inclined portion of the gray level with respect to position. If, therefore, the original profile g is subtracted from the background profile B, the extracted profile results in including a part of the background profile as shown by a hatched portion in FIG. 4d.

Figure 4F:
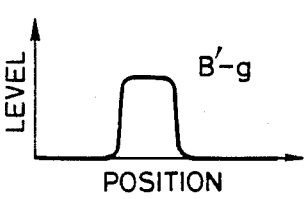

Then, according to the present invention, the obtained background profile as shown in FIG. 4c is further subject to a local minimum filtering operation of v times. As a result, the background profile B'(=F{g}max(u)·min(v)) as shown by a solid line in FIG. 4e can be obtained. If, at this time, v is equal to u, the inclined portion of B' coincides with that of the original profile g with respect to position. Accordingly, if the original profile g is subtracted from the background profile B', only the profile of the target image is extracted as shown in FIG. 4f. The threshold for the binarization of the profile as shown in FIG. 4f can be easily determined. A method, in which a background image is formed from an original picture in the manner as described above and the difference between the thus formed background image and the original picture is obtained, is called a minimum-maximum subtraction (MMS) method, hereinafter.

A conventional apparatus has processed an image with shading as shown in FIG. 4a by means of a so called shading correction, in which a reference image of a white paper is taken by an ITV camera, the unevenness of brightness in the image with shading is calculated by comparing it with the reference and, on the basis thereof, a correction value is obtained and stored. Such a shading correction, however, has no effect, unless the state of shading is always constant and the brightness in an original picture is also constant. The present invention as described above is effective for such condition, too, since a background image is obtained by the MMS method from an original picture.

Figure 5:
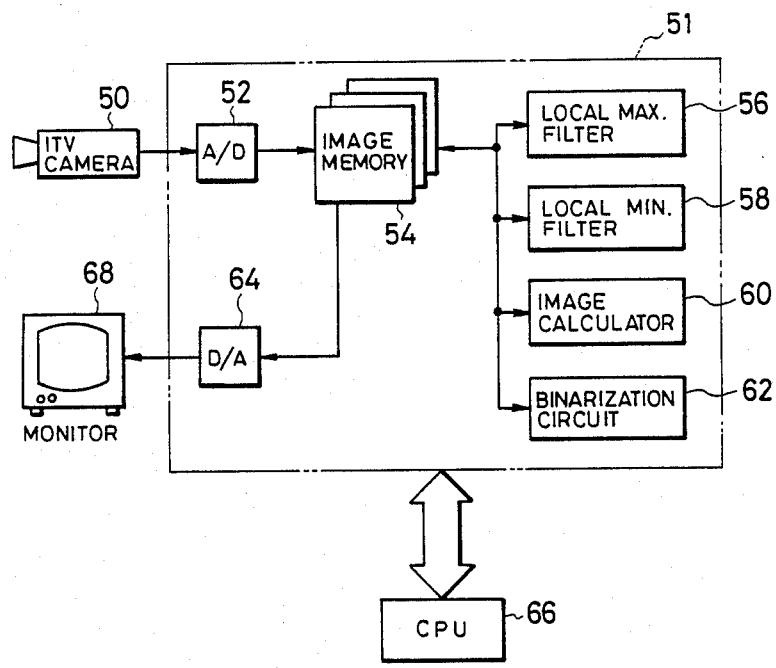
FIG. 5 is a schematic block diagram of an image processing apparatus, which is specifically designed for carrying out the above embodiments.

In FIG. 5 there is shown the whole configuration of an image processing system, which is designed for carrying out the image data processing mentioned above. In the figure, reference numeral 50 denotes an ITV camera for taking a picture of an object, reference numeral 51 a processor according to an embodiment of the present invention, which carries out the processing as mentioned above, and reference numeral 68 a monitor for displaying the resultant image processed by the processor 51.

In the processor 51, an analog/digital (A/D) converter 52 converts analog image data obtained by the camera 50 into digital data in terms of a gray level data of 128 levels and the converted data is stored in an image memory 54. The memory 54 is provided with K gray image memories $G_1$ to $G_K$ and L binary image memories $B_1$ to $B_L$, each capable of storing data for 256×256 pixels corresponding to one frame of the original picture taken by the camera 50. Therefore, the converted data mentioned above is stored in one of the gray image memories $G_1$ to $G_K$. Further, the binary image memories $B_1$ to $B_L$ are not always necessary, if the image data, in the succeeding processing, is processed as the gray image data without being converted into the binary data.

The processor 51 further has a local maximum filter 56 and a local minimum filter 58, which read out the image data from the image memory 54 and execute the filtering operation as already described, and again the result thereof is stored in the image memory 54. There is provided in the processor 51 an image calculator 60 which carries out the subtraction between various image data stored in the image memory 51. Also the result of the calculation is stored in the image memory 54 again.

The processor 51 is further provided with a circuit 62, which binarizes the image data read out from the image memory 54 and stores the binarized data in the image memory 54 again. The image data thus obtained and stored in the image memory 54 is read out and reconverted into an analog image data by a digital/analog (D/A) converter 64. The converted analog data is displayed on the monitor 68. Further, reference numeral 66 denotes a microcomputer, which controls the operation of the processor 51. The control operation will be made clear in the description later.

Figure 6:
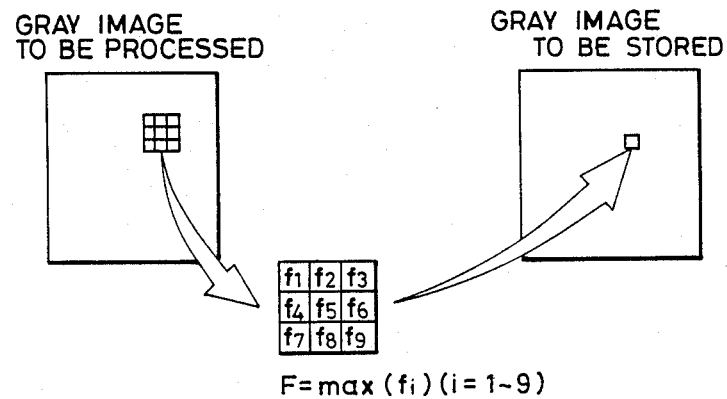
FIG. 6 is a drawing for explaining the operation of a two-dimensional local maximum filter used in the apparatus shown in FIG. 5.

By the way, in the foregoing, the one-dimensional filter as shown in FIG. 2a has been described. Since, however, an actual image has two dimensions, a two-dimensional filter is employed as the local maximum filter 56 and the local minimum filter 58. The basic operation of the two-dimensional filter is the same as that of the one-dimensional filter already described. FIG. 6 schematically shows the operation of one of examples of the two-dimensional filter. In this example, a filter of the size 3×3 is considered. In the two-dimensional maximum filter, for example, the maximum one F among the values $f_i$ of nine pixels $f_1$ to $f_9$ included within the scope of the filter is selected and then the value of $f_5$, a center one of the pixels $f_1$ to $f_8$ covered by the filter, is replaced by the selected maximum value F.

Figure 7:
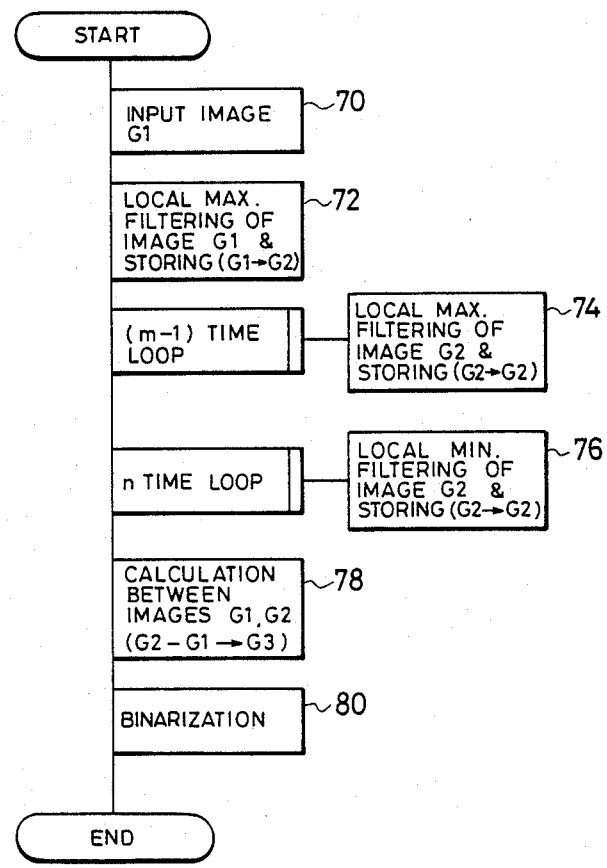
FIG. 7 is a flow chart showing the operation of the apparatus shown in FIG. 5.

Referring next to FIG. 7, the operation of the apparatus shown in FIG. 5 will be explained in the following. Let's assume that the size of the filter is 3×3 which is usually employed and a target image, e.g. a character, to be extracted is darker than a background.

After start of the operation, image data is inputted in the image memory $G_1$ (step 70). The image data stored in the memory $G_1$ is subject to the local maximum filtering operation in the local maximum filter 56, and the result thereof is stored in the image memory $G_2$ (step 72). The image data stored in the memory $G_2$ is read out in the local maximum filter 56 again and further is subject to a local maximum filtering operation. The result thereof is stored in the memory $G_2$ again (step 74). This loop operation is repeated m-1 times between the image memory $G_2$ and the local maximum filter 56. As a result, the image data stored in the memory $G_1$ is subject to the local maximum filtering operation a total of m times.

Thereafter, the image data stored in the memory $G_2$ is subject to a local minimum filtering operation n times in the local minimum filter 58 (step 76). During the filtering operation in the local minimum filter 58, the result of every filtering operation is stored in the memory $G_2$ repeatedly. The final image data thus obtained is an image data which is subject to m times of the local maximum filtering operation and n times of the local minimum filtering operation, wherein n is usually selected to be equal to m. The thus obtained image data becomes the background image data, in which, in this example, the recessed portion in the gray level distribution profile is filled up by the gray level of the background.

Then, the subtraction is carried out in the image calculator 60 between the data finally obtained and stored in the memory $G_2$ and the data stored in the memory $G_1$, and the result thereof is stored in a memory $G_3$ (step 78). After that, the image data stored in the memory $G_3$ is binarized by the binarization circuit 62 and stored in one of the binary image memories $B_1$ to $B_L$ of the image memory 54. In this binarization, a threshold arbitrarily selected in advance is used. There can be also employed an average value of the maximal and the minimal values in the obtained gray level distribution profile or an average value in the whole of the obtained gray levels. In any case, for the image data as stored in the memory $G_3$, the threshold for the binarization can be easily determined.

Further, a constant value is added to the background image to form an additional image, and if the original image is subtracted from the additional image, zero can be utilized as the threshold for the binarization of the thus obtained contrast image. Furthermore, if the contrast image obtained as the difference of the original picture and the background image is divided by an arbitrary value, noise components of small magnitude become much smaller and therefore the generation of noise is reduced at the time of the binarization.

Figure 8A:
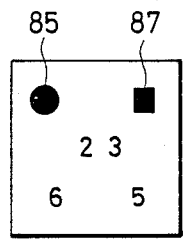
FIGS. 8a to 8b are drawings showing an example of the process of extracting target images from an original picture including undesired images (noise)
Figure 8B:
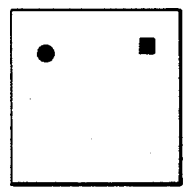
Figure 8C:
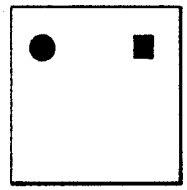
Figure 8D:
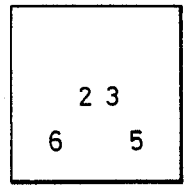

In FIGS. 8a to 8d, there is shown the result of the processing according to the above mentioned embodiment. FIG. 8a shows an original picture, in which the numerals "2", "3", "5" and "6" to be extracted and undesired stains 85 and 87 to be removed from the extraction are included. FIG. 8b shows the result of the local maximum filtering operation with respect to the original picture of FIG. 8a, the number of times of which depends on the thickness of the numerals to be extracted. It will be seen that, in the image of FIG. 8b, the numerals to be extracted are extinguished and simultaneously the figure of the stains 85 and 87 becomes somewhat smaller too. With respect to the image of FIG. 8b the local minimum filtering operation is carried out times equal to that of the local maximum filtering operation. As a result, the image as shown in FIG. 8c is obtained, in which the stains 85 and 87 recover their size, which is equal to that in the original picture of FIG. 8a. If, therefore, a subtraction is carried out between the images of FIGS. 8a and 8c, the image as shown in FIG. 8d which includes only the numerals to be extracted can be obtained.

Figure 9A:
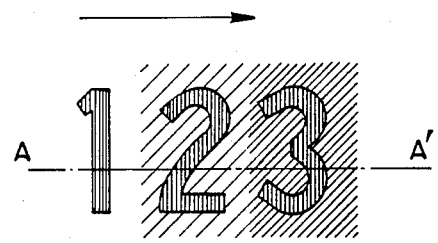
FIG. 9a shows another example of an original picture to be processed, which includes a target image (a number "123" in this case)

Referring next to FIGS. 9a to 9d, an explanation will be made of the case where an object including characters or numerals to be extracted is unevenly shaded. It is assumed here that, as shown in FIG. 9a, the object includes the numerals "1", "2" and "3" to be extracted as target images and there is the gradient in the brightness of the object. Namely, the object is shaded deeper in the direction of an arrow. Further, although the shading is stepwise in FIG. 9a, this is simply matter of convenience in drawing, and actually the shadow changes gradually and smoothly.

Figure 9B:
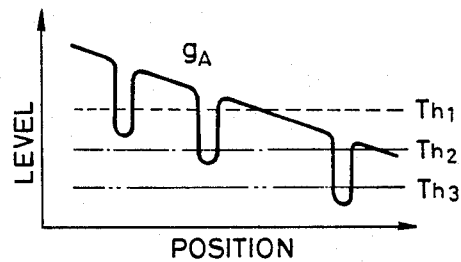
FIGS. 9b to 9d are diagrams showing the gray level distributions of various images, when the target image is extracted by the apparatus shown in FIG. 5, however in this case the original image becomes dark gradually from "1" toward "3"
Figure 9C:
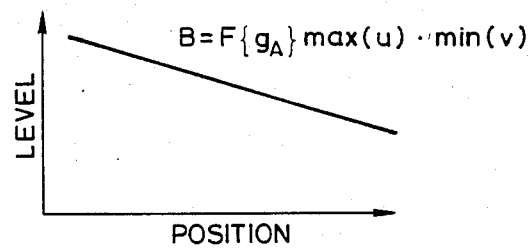

If an original picture as shown in FIG. 9a is scanned along with a scanning line A—A', the gray level distribution profile $g_A$ as shown in FIG. 9b is obtained. In the case of the profile shown, it is very difficult to determine a threshold Th by which all of the numerals can be extracted. If, in FIG. 9b, the threshold $T_{h1}$ is selected, for example, it is impossible to extract the numeral "3".

Figure 9D:
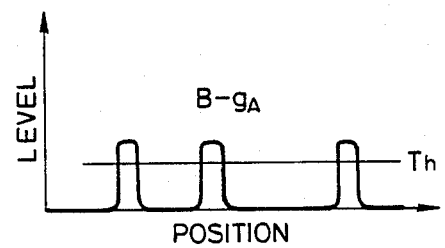

Then, the profile $g_A$ as shown in FIG. 9b is subject to the local maximum filtering operation u times and thereafter the local minimum filtering operation is carried out v times with respect to the result of the local maximum filtering operation. As a result, the gray level distribution profile of the background is obtained as shown by B $(=F\{g_A\}\max(u)\cdot\min(v))$ in FIG. 9c. If the subtraction is carried out between the gray level distribution profile $g_A$ of the original picture and that B of the background, the gray level distribution profile of the contrast image is obtained as shown in FIG. 9d. In the profile of FIG. 9d, a threshold Th for the binarization can be easily determined.

Figure 10A:
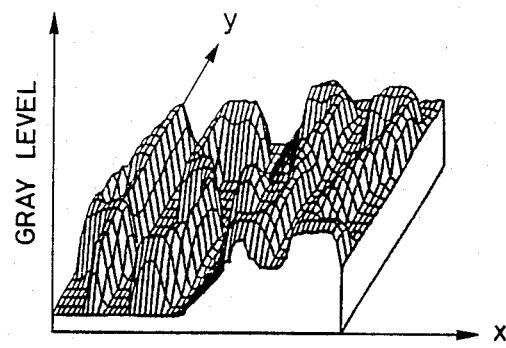
FIGS. 10a to 10c are drawings showing an example of the gray level distributions of the various images in three dimensions.
Figure 10B:
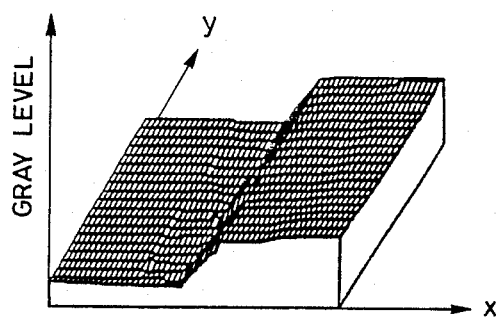
Figure 10C:
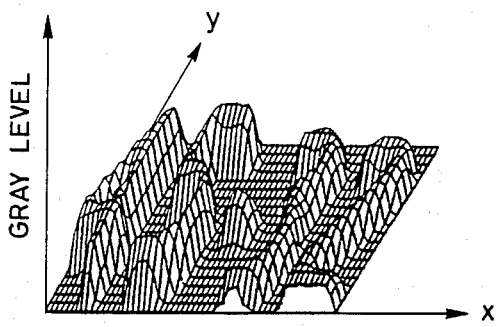

FIGS. 10a to 10c show an example, in which the gray level distribution profile of a two-dimensional image is illustrated in a three-dimensional manner. In this example, the two-dimensional image includes the number "45-32" as a target image to be extracted, and the number is brighter than the background. Further, the portion of "45" is shaded so that "32" is brighter than "45". In these figures, FIG. 10a shows a three-dimensional profile of the gray level distribution of the original picture and FIG. 10b that of the background. It will be clearly understood from FIG. 10b that the portion of "45" is shaded. FIG. 10c shows a three-dimensional profile of the gray level distribution of a contrast image, which is obtained by subtracting the profile of the background (FIG. 10b) from that of the original picture (FIG. 10a).

In the foregoing, the filter of the size $3\times3$ has been employed. As a result, in the case where the thickness of a character to be extracted corresponds to three pixels, for example, the local filtering operation had to be repeated three times in order to obtain a background image data from image data of an original picture. In this case, if the size of the filter is $5\times5$, the number of times of the local filtering operation decreases to two.

Further, if the size of the filter is $7\times7$, only one local filtering operation is sufficient. In this manner, data of a background image can be obtained from image data of an original picture by changing of the size of the filter in accordance with the thickness of the character to be extracted, in place of changing the number of times of repetition of the local filtering operation. Further, unless there is no unevenness in the brightness, as shown in FIG. 3, either one of the local maximum filter and the local minimum filter can produce data of a background image from image data of an original picture.

Figure 11A:
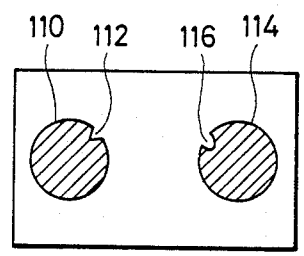
FIGS. 11a to 11c are drawings for explaining an example of the application of the present invention to the recognition of the figure of defects of bodies.
Figure 11B:
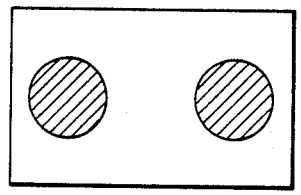
Figure 11C:
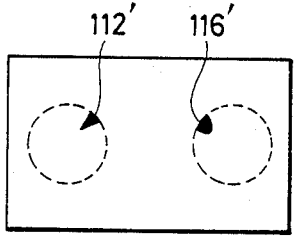

In the following, some applications of the embodiment mentioned above will be explained. According to one of them, the existence and figure of a flaw or notch on a body can be easily detected. In FIG. 11a, there is shown an original picture, in which bodies 110 and 114 have a flaw or notch 112 and 116, respectively. A background image is formed as shown in FIG. 11b by executing a local minimum filtering operation m times with respect to the original picture and then executing a local maximum filtering operation n times with respect to the result of the local minimum filtering operation, as described in the foregoing. Then, if a subtraction is carried out between the original picture of FIG. 11a and the background image of FIG. 11b, only the flaw or notch 112' and 116' can be extracted, as shown in FIG. 11c.

Referring next to FIGS. 12a to 12f, an explanation will be presented for the application of the embodiment to the detection of a spot or smudge on a body. In this case, it is to be noted that there are various kinds of spots or smudges; ones brighter than the body (white spot) and ones darker than the body (black spot). Further, their sizes are also in great variety. When the present embodiment is applied to the detection of such spots or smudges, it is impossible to detect bright ones and dark ones simultaneously. Further, since the number of repetitions of the local filtering operation is determined at a certain value in advance, very large spots or smudges can not be detected, either. If an attempt is made to detect such spots or smudges, the number of repetitions of the local filtering operation must be increased with the result that the time required for the processing becomes too large.

Figure 12A:
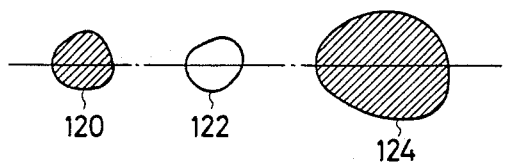
FIG. 12a shows an original picture in an example, in which the present invention is applied to the recognition of the figure of defects or stains on a body, which are different in their size and in the brightness relationship thereof to the background.

In FIG. 12a, there is shown an original picture, in which there exists a black spot 120, a white spot 122 and a black spot 124. Let's us assume here that, when measured along with a scanning line shown by a chain line in the figure, the size of the spot 120 corresponds to five pixels, that of the spot 122 corresponds to four pixels and that of the largest spot 124 corresponds to ten pixels. The number of repetitions of the local filtering operation is determined at three. Therefore, it is inadequate for the extraction of the spots the size of which is different from that of the spot 120.

Figure 12B:
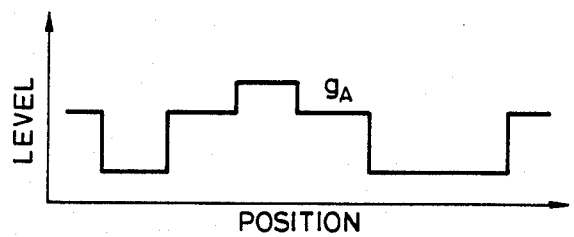
FIGS. 12b to 12e are diagrams showing the gray level distributions of various images.
Figure 12C:
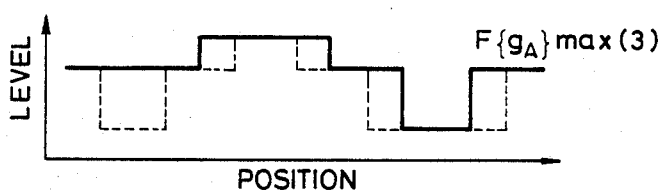

Under these conditions, when the scanning is carried out along with the chain line in FIG. 12a, the gray level distribution profile $g_A$ as shown in FIG. 12b is obtained. If the profile $g_A$ is subject to the local maximum filtering operation three times, the profile $F\{g_A\}\max(3)$ becomes as shown in FIG. 12c. In this profile, the recessed portion corresponding to the spot 120 is filled up perfectly by the gray level of a background image. A convex portion corresponding to the spot 122 is widened by three pixels on respective sides, so that the width thereof becomes to correspond to a total of ten pixels. Further, the recessed portion corresponding to the spot 124 is filled by three pixels on both sides, and therefore, the resultant width thereof corresponds to four pixels.

Figure 12D:
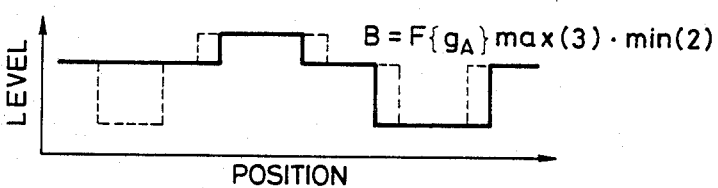

Thereafter, if the local minimum filtering operation is executed with respect to $F\{g_A\}\max(3)$ two times, the profile as shown in FIG. 12d is obtained as the gray level distribution profile B ($=F\{g_A\}\max(3)\cdot\min(2)$) of a pseudo background image. In this profile, the width of the convex portion corresponding to the spot 122 is narrowed and corresponds to a total six pixels, and the width of the recessed portion corresponding to the spot 124 is widened and corresponds to eight pixels. There still remains the information of the target images to be extracted in the profile as shown in FIG. 12d, and therefore it does not represent a true gray level distribution of the background image. In this sense, as described above, the profile of FIG. 12d was called the gray level distribution profile of the pseudo background image.

Figure 12E:
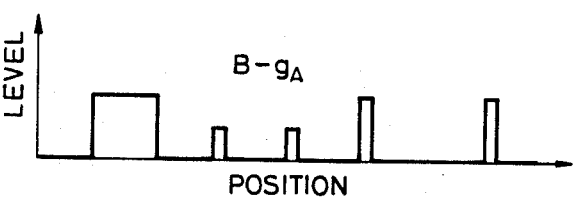

Then, if a subtraction is carried out between the profile $g_A$ (FIG. 12b) of the original picture and that B (FIG. 12d) of the pseudo background image, the gray level distribution profile as shown in FIG. 12e can be obtained. In this profile, the portion corresponding to the spot 120 has a width equal to that of the spot 120 in terms of the number of pixels. With respect to the spots 122 and 124, however, gray level signals for one pixel only appear at the portions corresponding to respective edges of the spots 122 and 124, because there is the difference by one time between the number of repetitions of the local maximum filtering operation and that of the local minimum filtering operation.

Figure 12F:
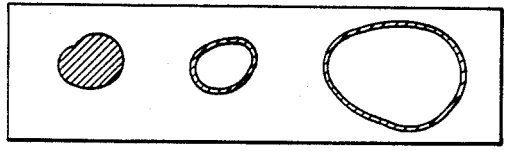
FIG. 12f shows resultant images which are extracted from the original picture.

If the gray level distribution of the profile as shown in FIG. 12e is displayed on the monitor, the displayed image becomes as shown in FIG. 12f. As apparent from this figure, the spot 120 can be extracted as a spot, however the spots 122 and 124 are extracted only in their contours, the thickness of which corresponds to one pixel. The inside of these contours can be filled up by a known image processing technique. However, in the detection of spots or smudges, it is not always necessary to fully detect the details inside their contours, and it is often sufficient to be able to certify the existence of the spots or smudges and the outline of the figure thereof. To such a case, the present embodiment can be easily applied.

Figure 13A:
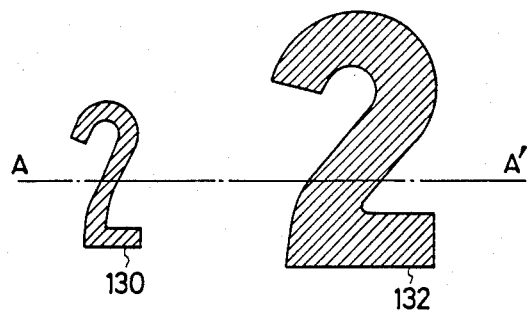
FIG. 13a shows an original picture in an example, in which the present invention is applied to the recognition of the characters of different thickness.
Figure 13B:
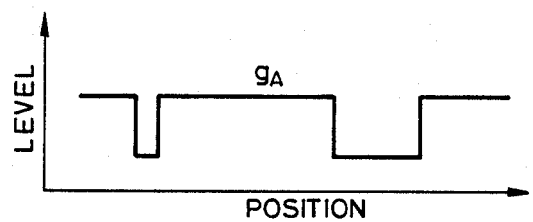
FIGS. 13b to 13g are diagrams showing the gray level distributions of various images.
Figure 13C:
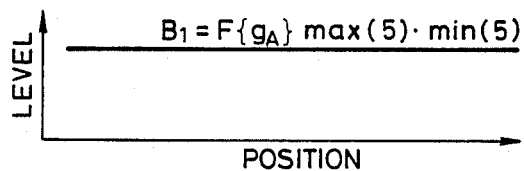
Figure 13D:
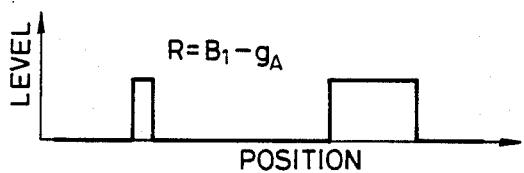

Referring to FIGS. 13a to 13g, the description will be made of the case where thick characters and thin ones are mixed as target images to be extracted, for example, as in a document image. It is assumed that, as shown in FIG. 13a, there are mixed the thin numeral "2", the thickness of which corresponds to three pixels, and the thick numeral "2", the thickness of which corresponds to nine pixels. Then, if the scanning is carried out along a chain line A—A', the gray level distribution profile $g_A$ as shown in FIG. 13b is obtained. Since the largest thickness corresponds to nine pixels, a background profile $B_1(=F\{g_A\}\max(5)\cdot\min(5))$ as shown in FIG. 13c can be formed by the local maximum filtering operation of five times and then the local minimum filtering operation of the same number of repetition times. Then, by subtracting $g_A$ from $B_1$, the gray level distribution profile R as shown in FIG. 13d can be obtained.

Figure 13E:
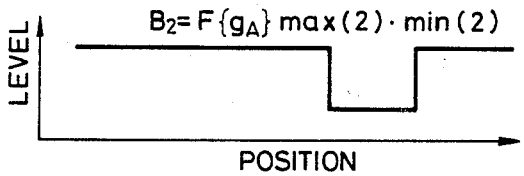
Figure 13F:
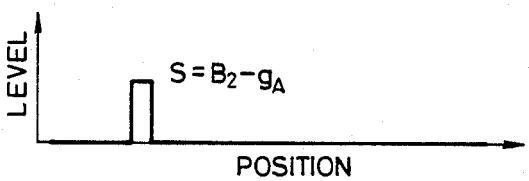
Figure 13G:
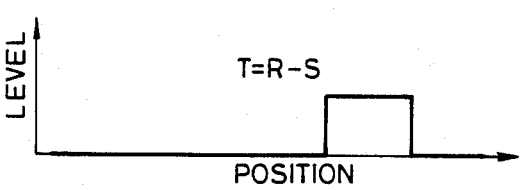

On the other hand, the gray level distribution profile $B_2(=F\{g_A\}\max(2)\cdot\min(2))$ as shown in FIG. 13e is obtained by executing the local maximum filtering operation of two times and then the local minimum filtering operation of the same number of repetition times. If a subtraction is carried out between $B_2$ and $g_A$, the gray level distribution profile S as shown in FIG. 13f can be obtained. By this profile S, a contrast image of only the thin character "2" is reproduced. Further, if the subtraction is carried out between R and S, the gray level distribution profile T ($=R-S$) as shown in FIG. 13g can be obtained. This profile T is caused by the thick character "2", and therefore a contrast image of only the thick character "2" is reproduced by the profile T.

Further, in case only the thick character "2" is necessary to be extracted, the following method is also available. Namely, data of the image of FIG. 13c is binarized by a certain threshold and data of the image of FIG. 13e is also binarized by the same threshold. Thereafter, both the binarized data are exclusive-ORed, so that a profile similar to that of FIG. 13g is obtained and therefore only the thick character "2" is extracted. In this manner, the present embodiment can be applied to the case where either or both of the thin and thick characters mixed should be extracted by appropriately determining the number of times of the repetition of the local filtering operation.

Another example of the application will be explained in the following. In vehicle license number plates, for example, there are various types. However, they can be roughly classified into the following two groups; i.e., ones which have the number painted by the deep color on the plate of the light color and the others which have the number painted by the light color on the plate of the deep color. An example of the former is shown by reference numeral 140 in FIG. 14 and an example of the latter by reference numeral 142 in the same figure.

In the case where the MMS method described hitherto is applied to the extraction or recognition of the license number from such license number plates, it is possible to determine which of the local maximum filter and the local minimum filter must be executed first, if it is known in advance which of the above mentioned groups a targeted license number plate belongs to. In such a case where license numbers must be continuously extracted from license number plates of running vehicles on a real time basis, it is necessary to discriminate for every vehicle whether or not the license number to be extracted is brighter than the background, i.e. the plate. The processing for this discrimination will be explained, referring to FIGS. 15 and 16.

It is noted that there is a difference in the histogram of gray level distribution between the number plate of the type 140 and that of the type 142. The difference is shown in FIG. 15, in which a solid line represents the histogram of the former type license number plate (green or black characters on a white or yellow plate in this case) and a broken line represents the histogram of the latter type license number plate (white characters on a green plate in this case). As apparent from these histograms, the frequency of the gray levels corresponding to the background is higher than that corresponding to the characters. Therefore, if the frequency relation is checked, it can be discriminated which of the characters and the background is brighter.

FIG. 16 is a flow chart showing the operation of discrimination processing. At step 160, the brightness relationship between the background and the characters to be extracted is decided by means of the histogram of the original picture. It is discriminated at step 162 whether the characters are brighter than the background or not. If yes, the MMS method is carried out in the order of the local minimum filtering and then the local maximum filtering, as shown at step 164. Otherwise, the local maximum filtering is first carried out and then the local minimum filtering is executed, as shown at step 166.

In this manner, it becomes possible to extract both the deep color characters and the light color ones by adding the discrimination processing of the brightness relationship between the characters to be extracted and the background.

Further, the following is also utilized in place of providing the discrimination processing of the brightness relationship between the characters and the background. Namely the processing according to the MMS method is carried out both in the order of the local minimum filtering and then the local maximum filtering and in the order opposite thereto. The following processing uses either one of the results of the MMS processing which includes the characters extracted.

Referring next to FIGS. 17a to 17f, another example will be explained, in which dark and bright characters are extracted simultaneously from an original picture in which both are mixed.

Figure 17A:
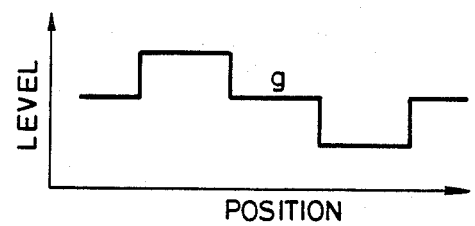
FIGS. 17a to 17f are diagrams sowing the gray level distributions of various images in the case where characters, which are different in their brightness, are extracted at the same time, one of the characters being brighter than the background and the other darker than the background.

Let's assume that a gray level distribution profile obtained along with a certain scanning line of an original picture is as shown in FIG. 17a. In this profile g, a convex portion corresponds to a bright character and a recessed portion to a dark character.

Figure 17B:
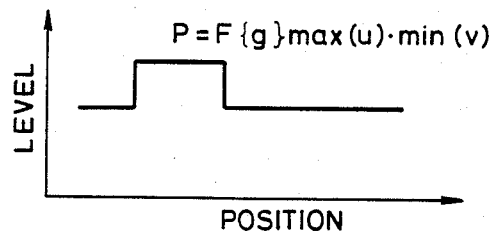
Figure 17C:
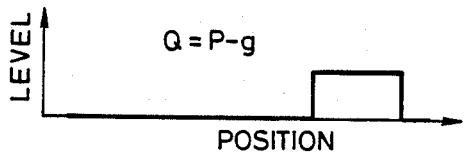

At first, the gray level distribution profile g is subject to the MMS processing in the order of the local maximum filtering of u times and then the local minimum filtering of v times. As a result, if u is selected to be equal to v, a gray level distribution profile P $(=F\{g\}\max(u)\cdot\min(v))$ as shown in FIG. 17b is obtained. As apparent from this figure, the recessed portion in the profile g is filled up to the gray level of the background and the convex portion in the profile g still remains in the profile P. Further, since u is equal to v, the width of the convex portion in the profile P is also equal to that in the profile g. If the calculation of $P-g$ is carried out, a gray level distribution profile Q of a contrast image between the background and the dark character can be obtained as shown in FIG. 17c.

Figure 17D:
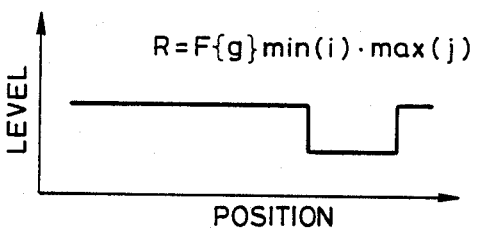
Figure 17E:
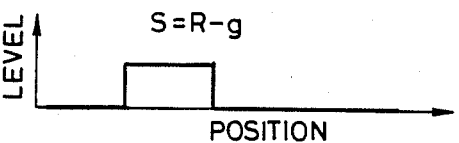

On the other hand, the profile g is also subject to the MMS processing in the order of the local minimum filtering and then the local maximum filtering so that the convex portion in the profile g is planed to become equal to the gray level of the background, however the recessed portion in the profile g remains, as shown as a profile $R(=F\{g\}\min(i)\cdot\max(j))$ in FIG. 17d. Next, if the thus obtained profile R is subtracted from the original profile g, a gray level distribution profile S is obtained as shown in FIG. 17e. This profile S corresponds to a contrast image between the bright character and the background.

Figure 17F:
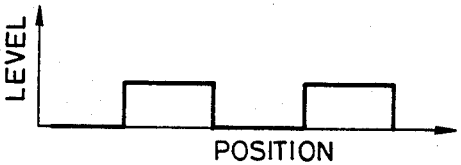

If the two gray level distribution profiles Q and S are added, a gray level distribution profile as shown in FIG. 17f can be obtained. As apparent from the figure, this profile includes the components of two contrast images; one for the bright character and the other for the dark one. In place of adding the two contrast images, the profile as shown in FIG. 17f can be also formed by obtaining the maximal value for every pixel in the two contrast images or calculating the difference between the two contrast images and thereafter obtaining the absolute value of the difference. Further, the two contrast images of FIGS. 17c and 17e are at first binarized and then the exclusive-OR operation is carried out between both the binarized data of the two contrast images, whereby both the dark and bright characters are extracted simultaneously.

Figures 18A, 18B, 19, 20:
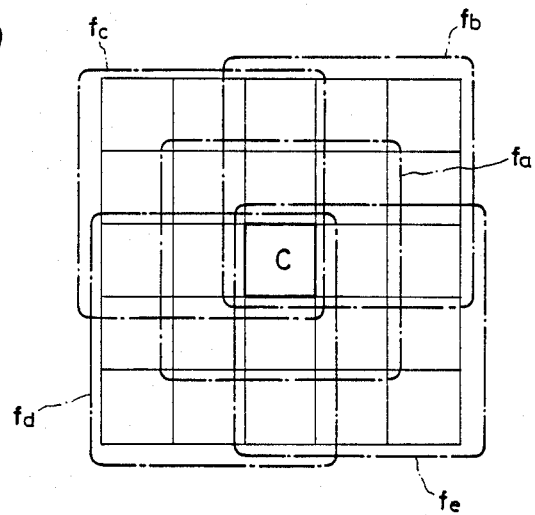
FIGS. 18a, 18b, 19 and 20 are drawings for explaining the construction of various filters capable of being utilized in the present invention.

In the following a further description will be made of the filter. In the filter of the size of $3 \times 3$ as used in the foregoing, for example, two kinds of filters are considered when taking account of the connectivity of neighboring pixels covered by the filter. In the filter of $3 \times 3$, for example, there is a four-connectivity filter, as shown in FIG. 18a, in which values of only pixels $f_1$, $f_2$, $f_4$, $f_6$ and $f_8$ are taken into consideration upon determination of a value of a center pixel $f_1$. Therefore, the above mentioned processing is expressed as $f_1 = \max(f_i)$ ($i = 1, 2, 4, 6, 8$). Incidentally, these pixels $f_2$, $f_4$, $f_6$ and $f_8$ are called care pixels, hereinafter. At that time, values of pixels $f_3$, $f_5$, $f_7$ and $f_9$, i.e., pixels on the diagonal with respect to $f_1$ in the matrix of the filter, are not cared about. These pixels are called don't care pixels, which in the figure are indicated by accompanying cross marks (x). FIG. 18b shows another type of the $3 \times 3$ filter, i.e., an eight-connectivity filter, in which when the value of the center pixel $f_1$ is determined, values of all the pixels $f_1$ to $f_9$ neighboring to $f_1$ are taken into consideration. Therefore, this processing is expressed as $f_1 = \max(f_i)$ ($i = 1$ to 9).

In the foregoing explanation, only the eight-connectivity filtering operation has been repeatedly carried out. However, if the local filtering is carried out while the connectivity is altered as the four-connectivity→the eight-connectivity→the four-connectivity, for example, a better image of the background can be obtained.

Further, if the size of the filter is $5 \times 5$, care pixels will be arranged as shown by small circles in FIG. 19. In this manner, if the size $n \times n$ of the filter is large enough, the care pixels are generally arranged such that the whole configuration of the arrangement of the care pixels becomes close to a circle, whereby the formation of the background image is much improved.

Furthermore, the number of times of the repetition of the local filtering operation can be decreased by preparing such a filter as shown in FIG. 20. As shown in the figure, this filter is composed of a total five sectional filters $f_a$, $f_b$, $f_c$, $f_d$ and $f_e$, each of which has the size of $3 \times 3$. The four sectional filters fb, fc, fd and fe are partially overlapped with each other and commonly include a center pixel C. The center sectional filter $f_a$ is so superimposed on the four other filters that the center pixel C is included in the center thereof.

Among these sectional filters, the following calculation is carried out;

$a = \max(f_a(i))$ $b = \max(f_b(i))$ $c = \max(f_c(i))$ $d = \max(f_d(i))$ $e = \max(f_e(i))$ wherein $i = 1$ to 9, further $f = \min(b, c, d, e)$ $g = \min(a, f)$ If g as mentioned above is obtained with respect to all of the pixels of an original picture, the result becomes equivalent to the result which is obtained by the processing of the local maximum filter and the local minimum filter, the size of which is $3 \times 3$. If the processing is carried out by a local maximum filtering of two repetition times and a local minimum filtering of the same numbers of repetition times, it is equivalent to the processing of one time of the execution of the filtering operation as shown in FIG. 20.

In the MMS method, there actually occur very small noises. Such small noises may cause no problem in many cases. However, in the application to detection of fine flaws, the small noises become a problem. Such small noises are caused by the following. Namely, the continuity of the brightness between the neighboring pixels is lost by the processing of the local filtering operation for obtaining the background image, and if a subtraction is taken between the original picture and the background image which loses the continuity of the brightness, the bright value is generated at the position of the pixel at which the continuity is lost.

Figures 21, 22:
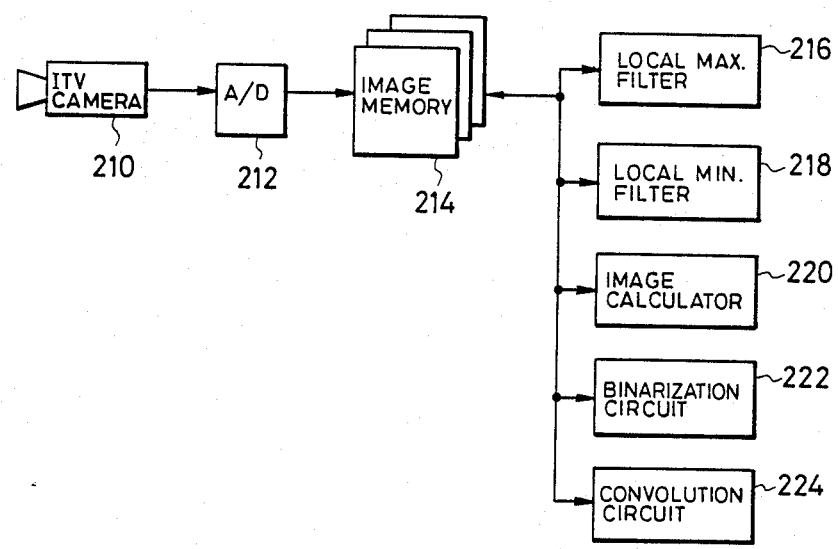
FIG. 21 schematically shows an image processing apparatus for carrying out still another embodiment of the present invention.
FIG. 22 shows an example of a smoothing filter utilized in the embodiment shown in FIG. 21.

Such noises are decreased by the processing in which the connectivity in the local filtering operation, such as the four-connectivity and the eight-connectivity, is taken into consideration. If a smoothing processing is added thereto, the decrease of the noises is much improved. Referring to FIG. 21, an explanation will be presented of another embodiment in which the smoothing processing is carried out.

In the figure, the same numerals represent the same components as in FIG. 5. Further, in this figure, the D/A converter 64, the monitor 68 add CPU 66 are omitted. This embodiment is further provided with a convolution circuit 224, in which a filter as shown in FIG. 22 is employed for the smoothing processing of the background image obtained by the MMS processing as already described. Data of the background image obtained by the MMS processing and stored in the image memory 214 is read out into the circuit 224 for the smoothing processing. As a result, discontinuous data in the background image is smoothed. If the original picture is subtracted from the continualized background image, the very small noises as already described are not generated. The data which is subject to the smoothing processing in the circuit 224 is stored in the image memory 214 again. The smoothed data stored in the memory 214 is read out into the binarization circuit 222. The operation thereafter is the same as already described.

Figure 23A:
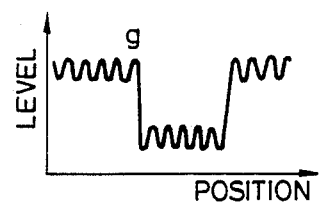
FIGS. 23a to 23g are drawings showing the gray level distributions for explaining a further embodiment of the present invention, in which image data includes very small noise signals.
Figure 23B:
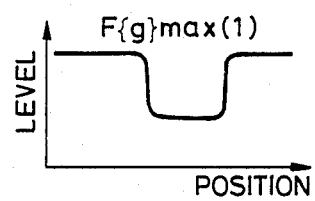
Figure 23C:
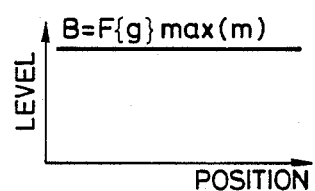
Figure 23D:
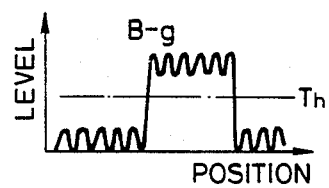

Referring to FIGS. 23a to 23g, the description will be made of the case where an original picture includes a lot of noise. A gray level distribution profile g of such a noisy original picture is shown in FIG. 23a. If such a profile g is subject to the local maximum filter one time, the profile $F\{g\}max(1)$ is obtained as shown in FIG. 23b. Further, if the local maximum filtering is performed m times, the gray level distribution profile $B(=F\{g\}max(m))$ as shown in FIG. 23c is obtained, which is the profile of the background image. In this example, since there is no inclination in the brightness, the local minimum filtering is not executed. Further, if the subtraction is performed between B and g, a contrast image of the gray level distribution profile as shown in FIG. 23d is obtained. In this case, as seen from FIG. 23d, the noise components still remain in the contrast image with a certain level maintained. Therefore, a threshold Th must be determined while paying attention to such a level of the noise component.

Figure 23E:
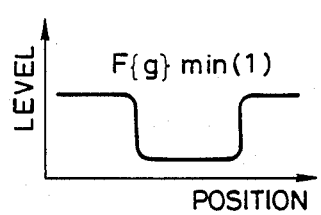
Figure 23F:
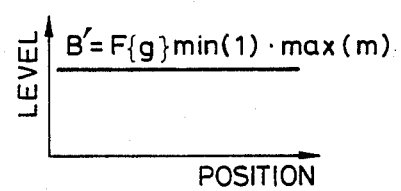
Figure 23G:
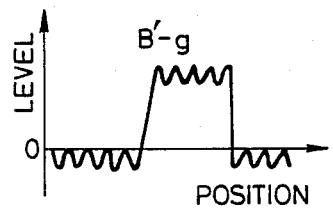

In order to execute the processing without paying attention to the remained noise level, the local minimum filtering is at first conducted with respect to g, so that a gray level distribution profile $F\{g\}min(1)$ as shown in FIG. 23e is obtained. Then, the local maximum filtering is carried out m times with respect to the profile $F\{g\}min(1)$, and as a result, a gray level distribution $B'(=F\{g\}min(1)\cdot max(m))$ is obtained, as shown in FIG. 23f. If a subtraction takes place between B' and g, a contrast image of the gray level distribution as shown in FIG. 23g can be obtained. Although the noise component is still included in the contrast image, it is lower than zero. Therefore, the threshold can be selected at a given value more than zero.

In the above explanation, the recessed portion in the profile g of the original picture has been extracted as a contrast image. In case the convex portion in the profile g of the original picture is necessary to be extracted, the local maximum filtering is first performed one time and then the local minimum filtering is carried out m times.

As described above, according to the present invention, even though a target image to be extracted is included in a complex background or the unevenness of the brightness changes every minute, the target image can be extracted quickly and clearly. Therefore, a threshold for the conversion of an gray image to a binary image can be easily determined.

Although we have herein shown and described several forms of apparatus embodying our invention and some applications, it is understood that various changes and modifications may be made therein within the scope of the appended claims without departing from the spirit and scope of our invention.

We claim:

1. A method for processing an original picture of a gray image composed of a target image and a background image to extract the target image separated from the background image, comprising the steps of:
    (a) obtaining a background image by processing gray levels of the original picture; and
    (b) extracting the target image on the basis of a different image between the original picture and the background image obtained in step (a).

2. A gray image processing method as defined in claim 1, wherein the step of obtaining the background image is achieved by filling up a recessed portion in the gray level distribution profile of the original picture by filtering processing of the original picture.

3. A gray image processing method as defined in claim 2, wherein filling up of the recessed portion is performed by repeating a local maximum filter processing by which the gray level of a pixel in the original picture is replaced by the maximal value of the gray levels of all pixels within a certain scope including the pixel.

4. A gray image processing method as defined in claim 3, wherein the number of times of repetition of the local maximum filter processing is determined in accordance with the width of the recessed portion in terms of the number of pixels in the original picture.

5. A gray image processing method as defined in claim 1, wherein the step of obtaining the background image is achieved by planing the convex portion in the gray level distribution profile of the original picture by filtering processing of the original picture.

6. A gray image processing method as defined in claim 5, wherein planing of the convex portion is performed by repeating a local minimum filter processing by which the gray level of a pixel in the original picture is replaced by the minimal value of the gray levels of all pixels within a certain scope including the pixel.

7. A gray image processing method as defined in claim 6, wherein the number of times of repetition of the local minimum filter processing is determined in accordance with the width of the convex portion in terms of the number of pixels in the original picture.

8. A gray image processing method as defined in claim 1, wherein the step of obtaining the background image is achieved by repeating at least one of a local maximum filter processing by which the gray level of a pixel in the original picture is replaced by the maximal value of the gray levels of at least some of pixels within a certain scope including the pixel and a local minimum filter processing by which the gray level of a pixel is replaced by the minimal value of the gray levels of at least some of the pixels within the certain scope including the pixel.

9. A gray image processing method as defined in claim 8, wherein there is taken a histogram of the gray level distribution in the original picture, and it is determined in accordance with the characteristic of the histogram which of the local maximum filter processing and the local minimum filter processing is first repeated.

10. A gray image processing method as defined in claim 8, wherein a first background image, in which the recessed portion in the gray level distribution profile of the original picture is filled up, is formed by repeating the local maximum filter processing, a first intermediate image is obtained by the calculation between the original picture and the first background image, a second background image, in which the convex portion in the gray level distribution profile of the original picture is planed, is formed by repeating the local minimum filter processing, a second intermediate image is obtained by the calculation between the original picture and the second background image, and the target image is formed by the calculation between the first and second intermediate images.

11. A gray image processing method as defined in claim 8, wherein both the local filter processings are carried out by replacing the gray level of a pixel in the original picture by the maximal or minimal value of the gray levels of pixels specified in advance within a certain scope including the pixel.

12. A gray image processing method as defined in claim 8, wherein the local maximum filter processing is first repeated with respect to the original picture and thereafter the local minimum filter processing is repeated with respect to the result of the local maximum filter processing.

13. A gray image processing method as defined in claim 12, wherein the number of times of repetition of the local minimum filter processing is equal to that of the local maximum filter processing.

14. A gray image processing method as defined in claim 13, wherein the number of times of repetition of both the filter processing is determined in accordance with the thickness or size of the target image in terms of the number of pixels in the original picture.

15. A gray image processing method as defined in claim 8, wherein the local minimum filter processing is first repeated with respect to the original picture and thereafter the local maximum filter processing is repeated with respect to the result of the local minimum filter processing.

16. A gray image processing method as defined in claim 15, wherein the number of times of repetition of the local maximum filter processing is equal to that of the local minimum filter processing.

17. A gray image processing method as defined in claim 16, wherein the number of times of repetition of both the filter processing is determined in accordance with the thickness or size of the target image in terms of the number of pixels in the original picture.

18. A gray image processing apparatus having a television camera for taking an original gray pictures of a predetermined area of an object, which is composed of a target image and a background image, an image memory for storing gray image data converted from the original picture of the analog form into the digital form, a processing unit in which the gray image data stored in the image memory is subject to a predetermined processing and the processed data is stored in the image memory again, and a monitor for reading out data from the image memory and displaying it thereon, whereby the target image is extracted as a contrast image separated from the background image comprising:

at least one local maximum filter in which the gray level of a pixel in the original gray picture read out from the image memory is replaced by the maximal value of the gray levels of at least some pixels within a certain scope including the pixel, and the replaced image data is stored in the image memory again, and a local minimum filter in which the gray level of a pixel in the original gray picture read out from the image memory is replaced by the minimal value of the gray levels of at least some of pixels within a certain scope including the pixel, and the replaced image data is stored in the image memory again, whereby the background image is formed on the basis of the original picture and is stored in the image memory; and an image calculator for executing a predetermined calculation between the original picture and the background image, both being read out from the image memory, to obtain a contrast image of the target image and for returning data of the contrast image as a result of the calculation to the image memory.

19. A gray image processing apparatus as defined in claim 18, wherein there is further provided a binarization circuit for binarizing data of the contrast image read out from the image memory and returning the binarized data to the image memory, whereby the contrast image is displayed on the monitor.

20. A gray image processing apparatus as defined in claim 19, wherein there is further provided a convolution circuit for reading out data of the contrast image from the image memory, filtering the data read out and returning the filtered data to the image memory.

* * * * *